United States Patent [19]

Harrell

[11] 4,094,088
[45] June 13, 1978

[54] MOBILE INSECT COLLECTING AND DESTROYING APPARATUS

[76] Inventor: Robert C. Harrell, 616 N. St. John, Dyersburg, Tenn. 38024

[21] Appl. No.: 741,694

[22] Filed: Nov. 15, 1976

[51] Int. Cl.² ............................................. A01M 1/20
[52] U.S. Cl. .................................................... 43/144
[58] Field of Search ........................................ 43/144

[56] References Cited

U.S. PATENT DOCUMENTS

| 1,530,681 | 3/1925 | Long | 43/144 X |
| 1,580,297 | 4/1926 | Hammock | 43/144 |
| 3,477,174 | 11/1969 | Lalor | 43/144 X |

*Primary Examiner*—Edgar S. Burr
*Assistant Examiner*—Daniel J. Leach

[57] ABSTRACT

Tractor mountable apparatus for collecting and destroying insects from multiple rows of plants, such as cotton, as the tractor passes along the rows is disclosed. The apparatus comprises a supporting frame including longitudinal support members mountable upon the front end of a tractor to project forward rather than rearwardly thereof, and transverse support members carried by the longitudinal support members. A plurality of insect destroying open topped metal pans are suspended from the transverse support members and are spaced to pass between rows of plants as the apparatus moves through a field. Each of the pans has an elongated perforated gas fired burner for heating the pan and for completely incinerating insects falling into the pans and laterally extending resilient agitator means or flexible aprons mounted thereon for knocking insects from the side branches of the plants. A vertically adjustable transverse agitator rod extends across the entire width of the apparatus directly above the pans for engaging the tops of plants and for knocking insects therefrom into the pans. Each of the pans is mounted to swing rearwardly and upwardly when encountering a stone or other low lying ground object, and motor operated means is provided for simultaneously raising and lowering all of the pans at the will of an operator.

14 Claims, 6 Drawing Figures

MOBILE INSECT COLLECTING AND DESTROYING APPARATUS

BACKGROUND OF THE INVENTION

1. Field of the Invention

This invention relates to mobile apparatus preferably carried on the frame of a tractor for movement through a field of row crops, such as cotton to agitate the plants in the rows being transversed and to knock insects therefrom so that the insects fall into a plurality of open pans moving between the rows whereby the insects are completely incinerated destroyed by the heat and flame from burners located in the open topped pans.

2. State of the Prior Art

Apparatus for removing insects from field row crops such as cotton, and for destroying the insects removed from the plants, have been previously proposed, Representative examples of the prior art proposals are found in the following patents:

| Pat No. | Patentee | Issue Date |
| --- | --- | --- |
| 803,371 | Tanner | Oct. 31, 1905 |
| 1,530,681 | Long | Mar. 24, 1925 |
| 2,564,774 | Allen | Aug. 21, 1951 |
| 2,608,023 | Dillon | Aug. 26, 1952 |
| 2,617,229 | Huseby | Nov. 11, 1952 |
| 2,740,228 | Riggs | Apr. 3, 1956 |

SUMMARY OF THE INVENTION

This invention provides an improved means for removing and destroying insects from multiple rows of row crops in a single pass through a field. While the invention is particularly advantageous for use in removing and destroying boll weevils and larvae from cotton plants, it may also be used for removing and destroying other types of insects from cotton and from other types of row crops.

It is an object of this invention to provide an improved tractor mountable insect collecting and destroying apparatus for collecting insects from growing plants in multiple rows by agitating the plants so that the insects drop into pans carried by the apparatus beneath the agitating means, and for destroying the insects by burning in the open topped pans heated by elongated burners mounted longitudinally therein.

It is an object of this invention to provide insect removing and destroying apparatus which includes a supporting frame which is readily attachable to and detachable from the front end of a tractor, a plurality of transversely spaced, elongated metal pans suspended beneath the frame, flexible agitator means for each pan for agitating the sides of plants in the rows passed by the pans and for knocking bugs therefrom, an elongated gas burner in each pan for heating the pans and destroying insects falling therein, a vertically adjustable agitator rod mounted above the pans and extending the full width of the apparatus for knocking insects from the tops of the plants as the apparatus passes along the rows, yieldable mounting means for each pan enabling each pan to swing rearwardly and upwardly when encountering an unyielding object, and motor operated means for selectively raising and lowering all of the pans simultaneously.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 6 is a partial bottom plan view of one of the gas burner pipes included in the invention.

DETAILED DESCRIPTION OF THE PREFERRED EMBODIMENT

Figure 1:
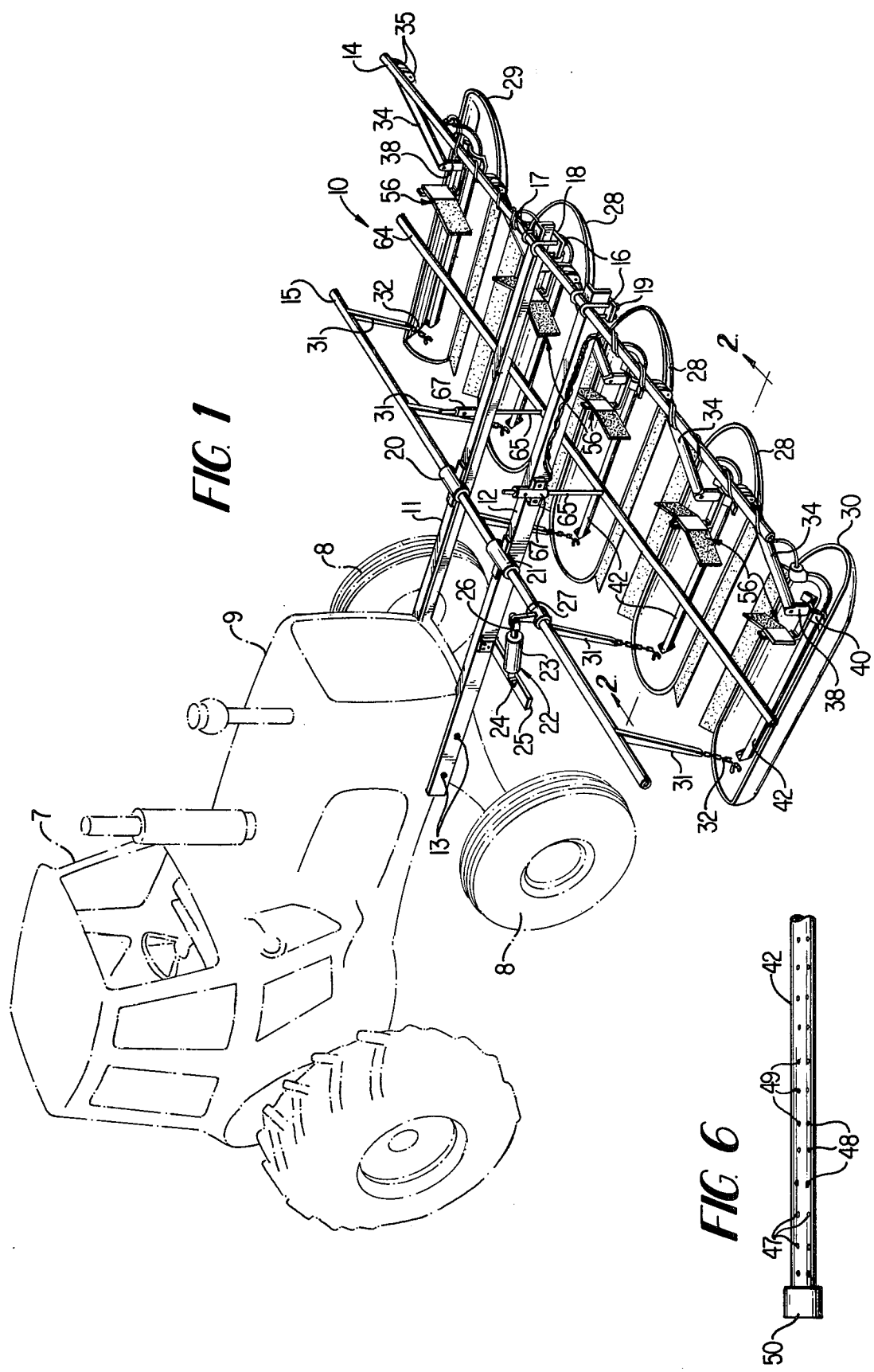
FIG. 1 is a perspective view showing the invention mounted on the front end of a row crop tractor which is shown in phantom.

Referring to the drawings and particularly to FIG. 1, the insect removing and destroying apparatus of this invention, generally indicated by the numeral 10, is illustrated as being detachably mounted forward of the front wheels 8 of a row crop tractor 9. The apparatus 10 includes a frame having a pair of parallel, transversely spaced longitudinal support members 11 and 12, and a pair of longitudinally spaced parallel transverse support members 14 and 15. The longitudinal support members 11 and 12 are preferably heavy gauge angle iron bars which extend rearwardly along opposite sides of the front end of the tractor and are bolted to the tractor by bolts 13. Major portions of the longitudinal support members 11 and 12 project forwardly of the tractor's front wheels 8 and have mounted thereon the parallel transverse support member 14 and 15, which are, for example, elongated pipes. The front transverse support member 14 is clamped on top of the longitudinal support members 11 and 12 by a pair of U-bolt clamps 16, 16. Each of the clamps 16 comprises a pair of U-bolts 17, 17 straddling the front transverse support member 14 on opposite sides of one of the longitudinal support members 11 and 12 and a clamping plate 18, positioned on the underside of the respective longitudinal support member, which is provided with apertures through which the downwardly extending legs of the U-bolts project. Nuts 19 are threaded on the ends of the U-bolts 17, 17 beneath the clamping plate 18 and are tightened against the plate 18 to draw the U-bolts downwardly and thus to secure the front transverse support member 14 firmly against the top of the longitudinal support members 11 and 12.

The rear transverse support member 15 is rotatably mounted on journal bearings 20, 21 affixed on top of the longitudinal support members 11 and 12 respectively and is prevented from axial motion. The member 15 may be rotated through an appropriate arc by means of a double acting fluid piston and cylinder motor 22. The cylinder 23 of the motor 22 is pivotally attached by a clevis 24 to a bracket 25 laterally projecting from the longitudinal support member 12 to which it is secured by welding, or other appropriate means. The end of the piston rod 26 extending from the cylinder 23 is forked and pivotally connected to a lever arm 27 non-rotatably affixed to the transverse support bar 15. Hydraulic lines extend from the cylinder 23 to the cab 7 of the tractor 9 where suitable hydraulic controls (not shown) for operating the motor 22 are mounted.

Figure 2:
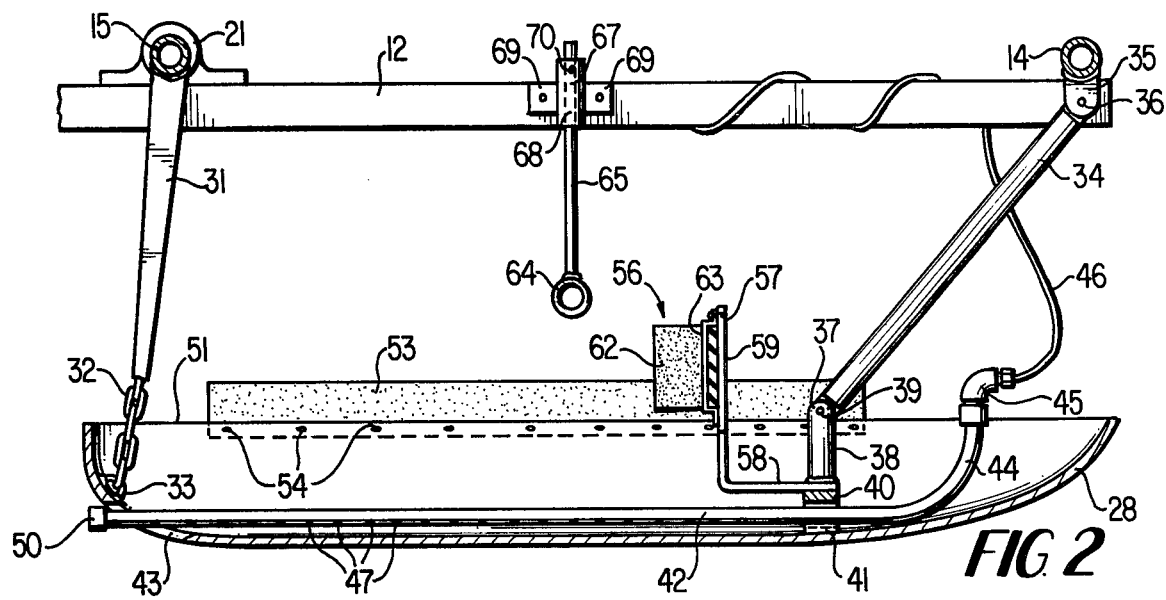
FIG. 2 is a vertical sectional view taken along line 2—2 in FIG. 1.
Figure 3:
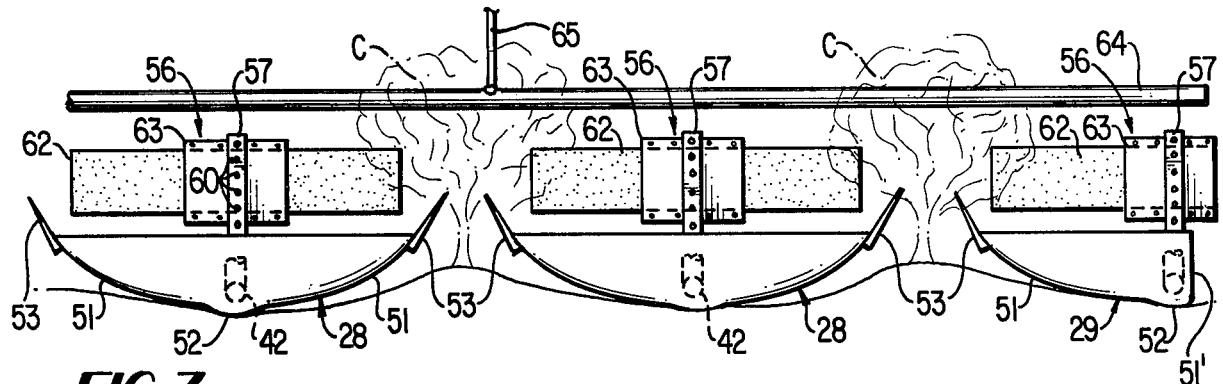
FIG. 3 is a partial front elevational view of the right hand portion of the invention shown in FIG. 1.

Suspended beneath the transverse support members 14 and 15 are a plurality of elongated intermediate insect destroying boat-shaped metal pans 28, and elongated right and left end pans 29 and 30. The end pans 29 and 30 and the three intermediate pans 28 are approximately equally spaced along the transverse support bars 14 and 15. Sufficient space is provided between adjacent pans to permit the passage of rows of cotton C, or other crops, between the pans as the tractor, with the insect removing and destroying apparatus of this invention attached, moves along the rows (FIG. 3). Each of the three intermediate pans 28 and each of the end pans 29 and 30 are supported at the rear by a bracket arm 31, affixed to and depending radially from the rear transverse support member 15, and by a chain 32 secured to the lower end of the bracket 31 by one end, and fastened to a ring 33 welded at the rear of the pan. The front end of each of the pans is pivotally supported from the front transverse support member 14 by a link 34 which is pivotally connected at its upper end between a pair of spaced parallel ears 35, 35 affixed to and depending from the member 14 by a pivot pin 36 (FIG. 2). The lower end of each of the links 34 is pivotally connected between the upper forked end 37 of an upstanding bracket 38 by a pivot pin 39. The bracket 38 has an arched base 40 with opposite end flanges 41, 41 that are shaped to conform to the inside surface of one of the respective pans and that are welded thereto.

It will be noted that the front transverse support member 14 is located directly above the front portions of the burner pans and at the front of the vehicle 9 instead of at the rear thereof. Such support member 14 serves to knock the insects from the plants and to drop them into the open topped burner pans, whereby they are incinerated by the hot pans and by the flame from the perforated burners.

The insect destroying metal pans 28, 29 and 30 can be lifted to provide ground clearance sufficient for turning or road travel by actuating the hydraulic motor 22 to force the piston rod 26 outwardly thereby turning the crank arm 27 forwardly and the bracket arms 31 rearwardly. Rearward motion of the bracket arms 31 from the position shown in FIG. 1 pulls the pans 28, 29 and 30 rearwardly and simultaneously lifts the pans above the ground. As the pans are pulled to the rear, the links 34 swing upwardly and lift the front ends of the pans so that the pans move rearwardly and upwardly in substantially parallel relationship to the ground. The pans are lowered by reversing the hydraulic motor 22 to retract the piston rod 26 and pull the crank arm 27 rearwardly thereby swinging the brackets 31 down.

The three intermediate metal pans 28 are substantially identical in structure because they are each designed to catch insects which are knocked from plants in rows on both sides of the pans along which the pans travel. The end pans 29 and 30 are of less width then the pans 18 because they are are designed to catch bugs knocked from the outside branches of plants in only the outside rows along which the apparatus 10 moves. The apparatus 10, as shown in FIG. 1, is designed to remove and destroy insects from four crop rows at a time, thus it requires three intermediate pans 28 and the two end pans 29 and 30. By extending the length of the transverse support bars 14 and 15 equally on opposite sides of the longitudinal support bars 11 and 12, and by adding additional intermediate pans 28, the apparatus 10 can be made to service more than four crop rows at one time. The intermediate pans 28 are preferably about 38 inches wide and about 45 inches long while the end pans 29 and 30 are preferably about 24 inches wide and about 45 inches long. Each of the pans 28, 29 and 30 includes an elongated perforated gas burner pipe 42 that runs the length of the pan and projects through an aperture 43 in the rear wall of the pan. The forward end 44 of the burner pipe 42 is curved upwardly and connected to a gas supply line 46 by suitable coupling means 45.

The bottom side of the burner pipe 42 includes multiple jet apertures 47 spaced lengthwise along the pipe in two longitudinal rows 48 and 49 as seen in FIG. 6. Each of the rows of jet apertures is offset circumferentially from a median longitudinal line at the bottom of the pipe so that burner gases are directed downwardly and laterally on each side of the pipe. The gases, when ignited, produce flames which impinge upon the bottom inner surface of the pan on opposite sides of the burner for heating the pan to a temperature sufficient to burn insects falling into the pan. The flame from the burner perforations or jets also directly contacts and incinerates the insects within the pans. The burner pipe 42 is closed at its rear end by a cap 50, or optionally by a plug (not shown) and is slightly elevated from the bottom of the pan to facilitate self-cleaning as it moves forward. The forward end portion of the pipe 42 extends beneath the arched base 40 of the bracket 38 which locates the pipe 42 with respect to the bottom of the pan. The intermediate pans 28 have gently outwardly and upwardly curved sides 51, 51 (FIG. 3) on opposite sides of a central bottom runner portion 52. The upwardly curved sides 51, 51 funnel insects to the burner pipe 42 and heated area adjacent thereto. Flanges 53, 53 of rubber, or other elastomeric material, and approximately three inches wide, are secured along the outboard edges of the sides 51, 51 by rivets 54 so as to protect the plants C from abrasive damage. The two end pans 29 and 30 each have one gently outwardly and upwardly curved side 51 on the inside of a bottom runner portion 52 and a steep outer side 51'. The gently curved sides 51 of the end pans 29 and 30 have elastomeric flanges 53 secured along the outboard edges thereof. The steep sides 51' of the pans 29 and 30 are on the outside of the apparatus 10 and do not require a protective elastomeric flange 53 because the steep sides normally are located intermediately between a pair of adjacent rows of plants and do not contact the plants. Above each of the pans 28, 29 and 30 is a vertically adjustable resilient agitator or apron generally indicated at 56 mounted upon an L-shaped bracket 57. The bracket 57 has a generally horizontal foot portion 58 and an integral upright portion 59. The end of the foot portion 58 is attached to the base 40 of the bracket 38 and extends rearwardly therefrom. The upright portion 59 has a plurality of longitudinally spaced apertures 60 through which bolts, screws or other suitable fasteners are selectively applied to secure the agitator 56 to the bracket. The agitators or aprons 56 each comprise a resilient strip 62, of rubber or other suitable elastomeric material extending laterally from the upright portion 59 of the bracket 57 and a clamp 63 transversely embracing the strip 62. The clamp 63 is secured at a selected height along the length of the upstanding bracket portion 59 by passing bolts or other fasteners through vertically spaced apertures in the clamp and through selected ones of the apertures 60 in the upstanding bracket portion 59.

The resilient agitator strips 62 for each of the pans 28, 29 and 30 are of a length to extend transversely across substantially the full width of the pan. In the case of the intermediate pans 28, the strip 62 is fastened medially of its length to the bracket 57 so that equal portions of the strip extend laterally from the bracket 57 over the opposite sides of the pan 28. In the case of the end pans 29 and 30, the strip 62 is secured by one end to the bracket 57 so that the resilient agitator strip extends laterally from only one side of the bracket 57. The agitators 56 are not motor operated but they simply react to the force exerted by the plants C brushing against them as the apparatus 10 moves along the plant rows.

As an alternate form (not shown), the agitators 56 may comprise metal plates which are hinged adjacent to the upstanding portion 59 of the bracket 57 and which are spring loaded to extend laterally from the bracket 57 across one side of the pan. In the case of the intermediate pans 28, a pair of spring loaded, hinged metal plates would be provided to extend laterally across the pan 28 in opposite directions. In the case of the end pans 29 and 30, only one hinged plate would be required.

A rigid horizontal agitator rod 64 extends transversely above all of the pans 28, 29 and 30 for the full width of the apparatus 10. A pair of spaced vertical rods 65, 65 which are rigidly connected to the agitator rod 64 as by welding, adjustably support the rod 64 from a pair of mounting brackets 67, 67 fastened to the longitudinal support members 11 and 12 respectively. The mounting brackets 67 each comprise a vertically oriented open ended cylinder 68 (FIG. 2) for slidably receiving one of the vertical support rods 65. The cylinder 68 has laterally extending flanges 69, 69 by which the bracket 67 is bolted or otherwise secured to one of the longitudinal support bars 11 and 12. The horizontal agitator rod 64 can be adjusted vertically to a selected height above the insect destroying pans 28, 29 and 30 and beneath the longitudinal support bars by sliding the vertical support rods 65 up or down within the mounting bracket cylinders 68 and by locking the rods within cylinders 68 at a selected position by tightening set screws 70 in the cylinders 68 which bear against the rod 65. The horizontal agitator rod 64 is adjusted to a suitable height for brushing against the tops of the plants C as shown in FIG. 3. The functions of the rigid horizontal agitator bar 64 and of the resilient agitators 56 are to brush against the tops and sides of the plants respectively, as the apparatus 10 moves along the crop rows, with sufficient force to knock insects from the plants. The insects knocked from the plants tend to fall toward the ground and are collected in the pans 28, 29 and 30 moving between the rows on top of the ground. The pans 28, 29 and 30 are of sufficient length so that when the insects are knocked from the plants by the agitators 56 and 64, most of the insects will fall within the pans and will be destroyed by the flames from the burner pipe 42 or by contact with the heated metal pans. The opening 43 at the rear end of the pans 28, 29 and 30 allows destroyed insects and other debris to pass out of the pan by the normal movement of the pan in operation.

Figure 4:
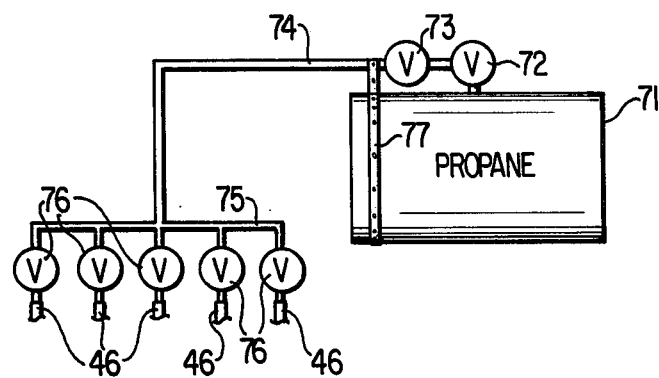
FIG. 4 is a diagramatic view of the gas supply and distribution system for the gas burners included in the invention.
Figure 5:
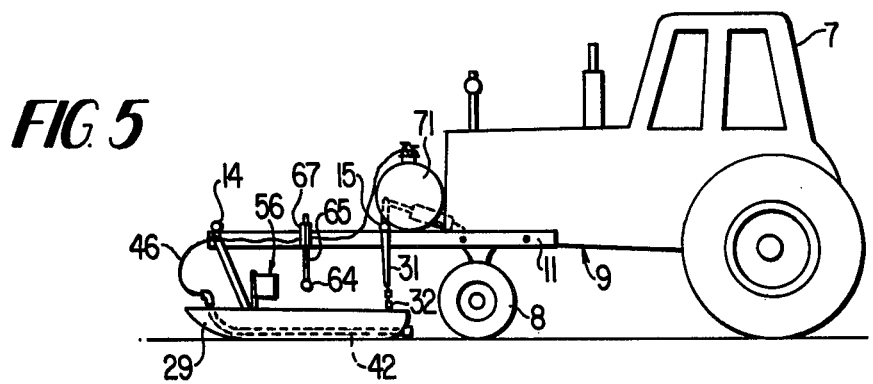
FIG. 5 is a side elevational view of the invention on a reduced scale.

The burner pipes 42 are supplied with a combustible gas, such as propane, from a gas tank 71 mounted on the longitudinal support members 11 and 12 in front of the tractor 9 as shown in FIG. 5. The system for the distribution of gas from the gas tank 71 is shown diagramatically in FIG. 4. It includes a main on-off valve 72 on top of the gas tank and a high pressure gas regulator valve 73, adjustable between about 45 and 100 PSIG, serially connected in a conduit 74 going from the tank 71 to a gas distributor manifold 75. Branching off from the manifold 75 are five individual lines feeding the gas burner pipes 42 in the two end pans 29, and 30 and in the three intermediate pans 28. Five individual gas control valves 76 are provided adjacent the manifold 75 for separate control of the five individual gas lines 46. The lines 46 leading from the individual gas control valves 76 are preferably flexible hoses. The conduit 74 leading to the manifold 75 is a rigid pipe which is supported by a bracket 77 strapped to the tank 71.

In use, the main gas valve 72 is turned on and the regulator valve 73 is adjusted to the desired gas pressure for distribution to the gas burners 42. In normal use, all of the individual regulator valves 76 are turned on to supply gas to the burner pipes in each of the pans 28, 29 and 30. The gas jets from the burner pipes 42 are preferably ignited manually, but an automatic ignition (not shown) may be optionally provided in each pan if desired. Once the burners 42 are ignited, the apparatus 10 is ready for travel and the tractor begins its movement through a field of row crops such as cotton, parallel to the rows so that the pans 28, 29 and 30 are spaced between the rows. The pans are lowered by operating the hydraulic motor 22 in a manner already described so that the pans slide on top of the ground or just above the ground. If any of the pans encounters an obstruction, such as a stone or other object close to the ground, the pan automatically swings rearwardly and upwardly because of its flexible support from the front transverse support rod 14 by hinged links 34 and from the rigid bracket arm 31 by chain 32. The motion of the apparatus 10 through the field causes the rigid agitator bar 64 and the agitators 56 to brush the plants in the rows with sufficient impact to knock insects from the plants. The insects falling into the pans 28, 29 and 30 are burned and the debris exits from the pans through the rear opening 43. At the end of the row, the operator may lift the pans by means of the hydraulic motor 22 while turning and positioning the apparatus for another pass through the field.

While in the foregoing there has been described and shown a preferred embodiment of the invention, various modifications and equivalents may be resorted to within the spirit and scope of the invention as claimed.

What is claimed is:

1. Tractor mountable apparatus for collecting and destroying insects from multiple rows of growing plants comprising a supporting frame including a pair of transversely spaced longitudinal support members mountable upon the front end of a tractor to project forward thereof, and a pair of front and rear longitudinally spaced transverse pan support and vine agitator members carried by the longitudinal support members, a plurality of open top elongated metal pans directly below the front transverse pan support and vine agitator member to receive bugs therefrom, suspension means for suspending said metal pans from said pair of transverse support members at spaced intervals so that said pans move adjacent the ground between the rows of plants as the apparatus moves along the plant rows, burner means in each of said metal pans for heating said pans and for burning insects falling into said pans, each of said pans having also separate vine agitator means mounted above and transversely across the pan for agitating the side branches of adjacent plants along which the pan moves, and for knocking insects into the pan, said suspension means including yieldable independent suspension means for each of said pans permitting each of said pans to swing rearwardly and upwardly when encountering a stone or other low lying ground object, and motor operated means for selectively raising and lowering all of said pans simultaneously.

2. The apparatus according to claim 1 together with a vertically adjustable transverse agitator means extending substantially across the entire width of the apparatus for engaging and agitating the tops of plants in the multiple rows along which the apparatus moves to knock insects therefrom, and vertically adjustable mounting means for supporting said transverse agitator means from said frame at a selected height relative to the tops of the plants.

3. The apparatus according to claim 2 wherein said transverse agitator means is an elongated linear rod having a pair of parallel support rods rigidly affixed perpendicular thereto on the same side of said rod, a pair of upright tubular mounting brackets affixed to said longitudinal support members for slidably receiving said pair of parallel support rods, and adjustable locking means for locking said support rods in said mounting brackets at a selected height.

4. The apparatus according to claim 1 wherein said burner means in each of said pans is a gas burner.

5. Tractor mountable apparatus for collecting and destroying insects from multiple rows of growing plants comprising a supporting frame including a pair of transversely spaced longitudinal support members mountable upon the front end of a tractor to project forward thereof, and a pair of longitudinally spaced transverse support members carried by the longitudinal support members, a plurality of open top elongated metal pans, suspension means for suspending said metal pans from said pair of transverse support members at spaced intervals so that said pans move adjacent the ground between the rows of plants as the apparatus moves along the rows, burner means in each of said metal pans for heating said pans and for burning insects falling into said pans, each of said pans having separate agitator means mounted above and transversely across the pan for agitating the side branches of adjacent plants along which the pan moves, and for knocking insects into the pan, said suspension means including yieldable independent suspension means for each of said pans permitting each of said pans to swing rearwardly and upwardly when encountering a stone or other low lying ground object, and motor operated means for selectively raising and lowering all of said pans simultaneously, said burner means in each of said pans being a gas burner, each of said gas burners comprising an elongated burner pipe mounted in and adjacent the bottom of the pan, said burner pipe extending longitudinally along at least a major portion of the length of the pan, a gas supply tank mounted on said supporting frame and gas distributing means for distributing gas from said gas supply tank to said gas burner in each of said metal pans.

6. The apparatus according to claim 5 wherein said gas distributor means includes a gas manifold and separate gas lines going from said supply manifold to each of said gas burners, there being a separate gas control valve in each of said separate gas lines for independently controlling the gas supply to each of said gas burners.

7. Tractor mountable apparatus for collecting and destroying insects from multiple rows of growing plants comprising a supporting frame including a pair of transversely spaced longitudinal support members mountable upon the front end of a tractor to project forward thereof, and a pair of longitudinally spaced transverse support members carried by the longitudinal support members, a plurality of open top elongated metal pans, suspension means for suspending said metal pans from said pair of transverse support members at spaced intervals so that said pans move adjacent the ground between the rows of plants as the apparatus moves along the rows, burner means in each of said metal pans for heating said pans and for burning insects falling into said pans, each of said pans having separate agitator means mounted above and transversely across the pan for agitating the side branches of adjacent plants along which the pan moves, and for knocking insects into the pan, said suspension means including yieldable independent suspension means for each of said pans permitting each of said pans to swing rearwardly and upwardly when encountering a stone or other low lying ground object, and motor operated means for selectively raising and lowering all of said pans simultaneously, said plurality of metal pans including a pair of outer pans and at least one intermediate pan between said outer pans, said intermediate pans having a bottom, a front wall, a rear wall, and a pair of outwardly and upwardly curved opposite side walls, and said outside pans having a bottom, a front wall, a rear wall, an outwardly and upwardly curved inside wall and a steep outside wall, elastomeric plant protector strips attached to the upper edge of each of said outwardly and upwardly curved opposite side walls of said intermediate pan and to the outwardly and upwardly curved inside walls of said outer pans for protecting plants from damage from contact with said metal pans, said outer pans being of substantially lesser width than said intermediate pans.

8. The apparatus according to claim 7 wherein the rear wall of each of said pans has an aperture therein adjacent the bottom of the pan, the aperture of said intermediate pans being located on the longitudinal center line of said pans, and the aperture of said outer pans being located adjacent the outside walls thereof, said apertures providing an exit for trash accumulating in said pans.

9. The apparatus according to claim 1 wherein said pans are generally boat shaped each having a longitudinal runner and an upwardly curved front for sliding over the ground and small objects on top of the ground.

10. Tractor mountable apparatus for collecting and destroying insects from multiple rows of growing plants comprising a supporting frame including a pair of transversely spaced longitudinal support members mountable upon the front end of a tractor to project forward thereof, and a pair of longitudinally spaced transverse support members carried by the longitudinal support members, a plurality of open top elongated metal pans, suspension means for suspending said metal pans from said pair of transverse support members at spaced inervals so that said pans move adjacent the ground between the rows of plants as the apparatus moves along the rows, burner means in each of said metal pans for heating said pans and for burning insects falling into said pans, each of said pans having separate agitator means mounted above and transversely across the pan for agitating the side branches of adjacent plants along which the pan moves, and for knocking insects into the pan, said suspension means including yieldable independent suspension means for each of said pans permitting each of said pans to swing rearwardly and upwardly when encountering a stone or other low lying ground object, and motor operated means for selectively raising and lowering all of said pans simultaneously, said pair of spaced transverse support members including a front transverse support member and a rear transverse support member, means securing said front transverse support member to said longitudinal support members against movement, means rotatable mounting said rear transverse support member on said longitudinal support members while preventing axial movement thereof, a plurality of bracket arms spaced along the length of said rear transverse support member and fixed thereto, all of said bracket arms extending in the same direction and lying in substantially a common plane, a lever arm attached to said rear support rod, said yieldable independent suspension means for each of said pans including flexible means for supporting the rear of one of said pans from one of said bracket arms, and connecting link means pivotally connecting the front end of one of said pans to the front transverse support member, said motor operated means for selectively raising and lowering all of said pans simultaneously including a double acting fluid piston and cylinder motor, and conrol means for selectively and alternately supplying and exhausting fluid to and from opposite ends of said cylinder to move said piston in opposite directions, bracket means connected to one of said longitudinal supports for pivotally supporting said cylinder, a piston rod extending from said piston and pivotally connected to said lever arm so that the movement of said piston in one direction rotates said lever arm and bracket arms secured to said rear transverse support member in one direction to pull said pans rearwardly and upwardly, while movement of said piston within said cylinder in the opposite direction lowers said pans to adjacent the ground.

11. The apparatus as defined in claim 1 wherein the incinerating pans are elongated and the burner means comprise perforated elongated burners running substantially the entire length of the pans.

12. The apparatus as defined in claim 11 wherein the burner means are arranged to incinerate the insects collected in the pans be direct contact with flame from the burners.

13. The apparatus as defined in claim 1 wherein the pans are provided with flexible extensions to avoid injury to the plants.

14. An apparatus as defined in claim 1 wherein each separate vine agitating means is mounted on a burner pan, below and intermediate the longitudinally spaced transversed support and agitating members, said separate agitator means comprising a pair of spaced resilient strips of elastomeric material adapted to engage portions of the plants immediately above the incinerator pan and to direct insects into the pan below.

* * * * *